(12) United States Patent
Lai

(10) Patent No.: US 12,124,618 B2
(45) Date of Patent: Oct. 22, 2024

(54) SOC ARCHITECTURE AND DATA PROTECTION METHOD THEREOF

(71) Applicant: FARADAY TECHNOLOGY CORPORATION, Hsinchu (TW)

(72) Inventor: Chun-Yuan Lai, Hsinchu (TW)

(73) Assignee: FARADAY TECHNOLOGY CORPORATION, Hsinchu (TW)

( * ) Notice: Subject to any disclaimer, the term of this patent is extended or adjusted under 35 U.S.C. 154(b) by 322 days.

(21) Appl. No.: 17/899,653

(22) Filed: Aug. 31, 2022

(65) Prior Publication Data

US 2023/0351055 A1 Nov. 2, 2023

(30) Foreign Application Priority Data

Apr. 27, 2022 (TW) .................... 111116008

(51) Int. Cl.
*G06F 21/72* (2013.01)
*G06F 21/57* (2013.01)
*H04L 9/06* (2006.01)
*H04L 9/08* (2006.01)
*H04L 9/14* (2006.01)

(52) U.S. Cl.
CPC ............ *G06F 21/72* (2013.01); *G06F 21/575* (2013.01); *H04L 9/0618* (2013.01); *H04L 9/0894* (2013.01); *H04L 9/14* (2013.01); *G06F 2221/034* (2013.01)

(58) Field of Classification Search
CPC .. G06F 21/72; G06F 21/575; G06F 2221/034; H04L 9/0618; H04L 9/0894; H04L 9/14
See application file for complete search history.

(56) References Cited

U.S. PATENT DOCUMENTS

| 7,299,358 | B2 | 11/2007 | Chateau et al. | |
| 11,650,741 | B2* | 5/2023 | Kloth | G06F 21/72 |
| | | | | 726/26 |
| 12,008,246 | B2* | 6/2024 | Kloth | H04L 9/0897 |
| 2008/0301468 | A1* | 12/2008 | Murase | G06F 21/79 |
| | | | | 713/193 |
| 2010/0199096 | A1* | 8/2010 | Du | G06F 12/1441 |
| | | | | 713/176 |

(Continued)

FOREIGN PATENT DOCUMENTS

TW    I377468 B    11/2012

*Primary Examiner* — Shin-Hon (Eric) Chen
*Assistant Examiner* — Thomas A Carnes
(74) *Attorney, Agent, or Firm* — WPAT, P.C

(57) ABSTRACT

An SoC architecture includes a non-volatile memory and an SoC chip. The SoC chip is connected with the non-volatile memory. The SoC chip includes a central processing unit, a volatile memory, a system bus, an on-the-fly decryption circuit, a memory interface, a timer and a key bank. The on-the-fly decryption circuit is connected with the key bank. The on-the-fly decryption circuit performs an encryption operation or a decryption operation according to plural keys in the key bank. After the SoC architecture is powered on, if the timer is not disabled and the timer has counted time for a specified time period, the central processing unit is subjected to a warm reset, and a storage format in the non-volatile memory is changed from an initial format to an operation format by the central processing unit.

8 Claims, 3 Drawing Sheets

(56) References Cited

U.S. PATENT DOCUMENTS

| | | | | |
|---|---|---|---|---|
| 2014/0040584 A1* | 2/2014 | Muchsel | ................. | G06F 21/71 |
| | | | | 711/163 |
| 2017/0060775 A1* | 3/2017 | de Perthuis | ........... | H04L 9/0822 |
| 2021/0312057 A1* | 10/2021 | Kloth | .................... | G06F 21/575 |

* cited by examiner

SOC ARCHITECTURE AND DATA PROTECTION METHOD THEREOF

This application claims the benefit of Taiwan Patent Application No. 111116008, filed Apr. 27, 2022, the subject matter of which is incorporated herein by reference.

FIELD OF THE INVENTION

The present invention relates to a circuitry structure and a data protection method of the circuitry structure, and more particularly to a system on a chip (SoC) architecture for an external non-volatile memory and a data protection method of the SoC architecture.

BACKGROUND OF THE INVENTION

Generally, a system on a chip (also referred as an SoC chip) is usually applied to an embedded system and used as a control center of the embedded system. The system on a chip architecture (also referred as an SoC architecture) of the embedded system is composed of an SoC chip and an external non-volatile memory. In the SoC architecture, the SoC chip is connected with the external non-volatile memory. The program code to be executed by the SoC chip is stored in the external non-volatile memory. However, the competitors can easily spy on the program code in the external non-volatile memory and learn how the SoC chip works.

In the security-related embedded system, the program code is firstly encrypted as a ciphertext, and then the ciphertext is stored in the external non-volatile memory. After a decryption operation, the ciphertext is decrypted into a plaintext. In other words, the encrypted program code may be considered as the ciphertext, and the decrypted program code may be considered as the plaintext. Since the ciphertext is stored in the external non-volatile memory, the competitors cannot know the operations of the SoC chip after the ciphertext in the external non-volatile memory is stolen.

FIG. 1 is a schematic circuit diagram illustrating an SoC architecture for a conventional embedded system. The SoC architecture 190 comprises a system on a chip (also referred as an SoC chip) 100 and a non-volatile memory 160. The SoC chip 100 comprises a central processing unit (CPU) 110, an embedded flash memory (eFlash) 120, a system bus 130, an on-the-Fly decryption circuit (also referred as an OTFDEC circuit) 140, and a memory interface 150. Moreover, a boot code is stored in the embedded flash memory 120. In addition, the SoC chip 100 is connected with the external non-volatile memory 160 through the memory interface 150.

Please refer to FIG. 1. When the embedded system is powered on, the SoC chip 100 performs an initialization process according to the boot code in the embedded flash memory 120. Firstly, an instruction pointer (IP) of the central processing unit 110 points to the address of the embedded flash memory 120. Then, the central processing unit 110 reads and executes the boot code in the embedded flash memory 120 through the system bus 130 and completes the initialization process.

After the initialization is completed, the SoC chip 100 is operated normally. When the embedded system is operated normally, the instruction pointer points to the non-volatile memory 160. Consequently, the central processing unit 110 accesses the ciphertext from the non-volatile memory 160. However, since the central processing unit 110 cannot execute the encrypted program code in the ciphertext directly, the OTFDEC circuit 140 performs an encryption operation and a decryption operation according to a key 142.

For example, the OTFDEC circuit 140 reads the ciphertext from the non-volatile memory 160 through the memory interface 150. Then, the OTFDEC performs the decryption operation on the ciphertext according to the key 142. After the ciphertext is converted into a plaintext, the central processing unit 110 executes the decrypted program code in the plaintext. Moreover, when the central processing unit 110 stores a data into the non-volatile memory 160, the data is firstly encrypted into a ciphertext by the OTFDEC circuit 140. Then, the ciphertext is stored into the non-volatile memory 160 through the memory interface 150.

As mentioned above, in the conventional SoC architecture 190, the contents transmitted between the OTFDEC circuit 140, the memory interface 150 and the non-volatile memory 160 are all ciphertexts, and the contents transmitted between the central processing unit 150, the embedded flash memory 120 and the OTFDEC circuit 140 are all plaintexts. Consequently, the data protection purpose can be achieved by the conventional SoC architecture.

Generally, the central processing unit 110 needs to access the data from the external non-volatile memory 160 in real time. If the access latency is too long, the performance of the SoC chip 100 is deteriorated. Consequently, the encryption and decryption algorithm in the OTFDEC circuit 140 needs to have low latency. In other words, the OTFDEC circuit 140 cannot use the complicated encryption and decryption algorithm. If the OTFDEC circuit 140 uses the complicated encryption and decryption algorithm, the access latency is too long.

Generally, the competitors may crack the key 142 by observing the relationship between the plaintext and the ciphertext. In order to avoid the above problem, the OTFDEC circuits 140 in different SoC architectures 190 use different keys. Moreover, the key used in each OTFDEC circuit 140 is a unique key that cannot be read.

FIG. 2 schematically illustrates n identical conventional embedded systems. The SoC architectures in the n identical embedded systems are identical. Moreover, each of the n SoC chips 201~20n is connected with a corresponding one of the n non-volatile memory 261~26n. Each of the SoC chips 201~20n has the circuitry structure similar to the SoC chip 100 as shown in FIG. 1. The internal relationships of the SoC chips 201~20n are not redundantly described herein.

Generally, the central processing units of the SoC chips 201~20n are operated according to the same plaintext. That is, the central processing units of the SoC chips 201~20n are operated according to the same decrypted program code. Moreover, since the SoC chips 201~20n perform the encryption operations and the decryption operations according to different keys $Key_1$~$Key_n$, different ciphertexts (ciphertext$_1$~ciphertext$_n$) are stored in the corresponding non-volatile memories 261~26n.

For example, the SoC chip 201 decrypts the corresponding ciphertext (i.e., ciphertext$_1$) into a plaintext according to the corresponding key (i.e., $Key_1$). Consequently, the central processing unit 210 of the SoC chip 201 executes the decrypted program code in the plaintext. Moreover, when the central processing unit 201 of the SoC chip 201 stores a data into the non-volatile memory 261, the SoC chip 201 encrypts the data into the corresponding ciphertext (i.e., ciphertext$_1$) according to the corresponding key (i.e., $Key_1$). Then, the corresponding ciphertext (i.e., ciphertext$_1$) is stored into the non-volatile memory 261.

As mentioned above, the SoC chips 201~20n are operated normally according to the corresponding keys $Key_1$~$Key_n$. If one of the SoC chips 201~20n is connected with the unmatched one of the non-volatile memories 261~26n during the manufacturing process, the SoC chip cannot be operated normally. For example, the SoC chip 201 is erroneously connected with the non-volatile memory 262 that stores the unmatched ciphertext (i.e., $ciphertext_2$). Obviously, since the SoC chip 201 performs the decryption operation on the unmatched ciphertext (i.e., $ciphertext_2$) according to the key Key1, the plaintext is not generated. Consequently, the SoC chip 201 cannot execute the decrypted program code. Under this circumstance, the embedded system is crashed and unable to be operated normally.

As mentioned above, during the manufacturing process of the conventional embedded system, it is necessary to confirm that the non-volatile memory 261 is connected with the SoC chip 201 after the ciphertext (i.e., $ciphertext_1$) generated according to the key $Key_1$ is stored into the non-volatile memory 261. Otherwise, if the SoC chip 201 is connected with the unmatched non-volatile memory, the embedded system cannot be operated normally. In other words, during the mass production process of the conventional embedded systems, it is necessary to confirm the connecting relationships between the SoC chips 201~20n and the corresponding non-volatile memories 261~26n. Consequently, the management cost in the mass production process is largely increased.

In the conventional embedded system, the embedded flash memory 120 of the SoC chip 100 is used as the boot area. Moreover, the embedded flash memory 120 is responsible for managing the encryption and the decryption of the non-volatile memory 160.

SUMMARY OF THE INVENTION

An embodiment of the present invention provides an SoC architecture. The SoC architecture includes a non-volatile memory and an SoC chip. The SoC chip is connected with the non-volatile memory. The SoC chip includes a central processing unit, a volatile memory, a system bus, an on-the-fly decryption circuit, a memory interface, a timer and a key bank. The central processing unit, the volatile memory and the on-the-fly decryption circuit are connected with the system bus. The memory interface is connected between the on-the-fly decryption circuit and the non-volatile memory. The on-the-fly decryption circuit is also connected with the key bank. The on-the-fly decryption circuit performs an encryption operation or a decryption operation according to plural keys in the key bank. After the SoC architecture is powered on, if the timer is not disabled and the timer has counted time for a specified time period, the central processing unit is subjected to a warm reset, and a storage format in the non-volatile memory is changed from an initial format to an operation format by the central processing unit.

Another embodiment of the present invention provides a data protection method for the SoC architecture. The data protection method includes the following steps. In a step (a), after the SoC architecture is powered on, the on-the-fly decryption circuit is operated in a normal mode. In a step (b), the central processing unit executes an encrypted boot code in the non-volatile memory. The encrypted boot code contains a disable command for disabling the timer. In a step (c), if the timer is disabled, the central processing unit executes an encrypted program code in the non-volatile memory. Consequently, so that the SoC architecture is operated normally. In a step (d), if the timer is not disabled and the timer has counted time for a specified time period, an operation mode of the on-the-fly decryption circuit is changed to a bypass mode, and a warm reset of the central processing unit is triggered. In a step (e), after the warm reset of the central processing unit is completed, the central processing unit executes an initial boot code in the non-volatile memory. The initial boot code contains the disable command for disabling the timer. In a step (f), if the timer is not disabled, the step (d) is performed again. In a step (g), if the timer is disabled, the central processing unit copies the initial boot code from the non-volatile memory to the volatile memory, and executes the initial boot code in the volatile memory. In a step (h), the central processing unit changes the operation mode of the on-the-fly decryption circuit to a two-key mode according to the initial boot code in the volatile memory. In a step (i), the central processing unit reads an encrypted data from non-volatile memory to the SoC chip according to the initial boot code in the volatile memory, and stores the encrypted data into the non-volatile memory again. In a step (j), a system reset is performed.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 1:
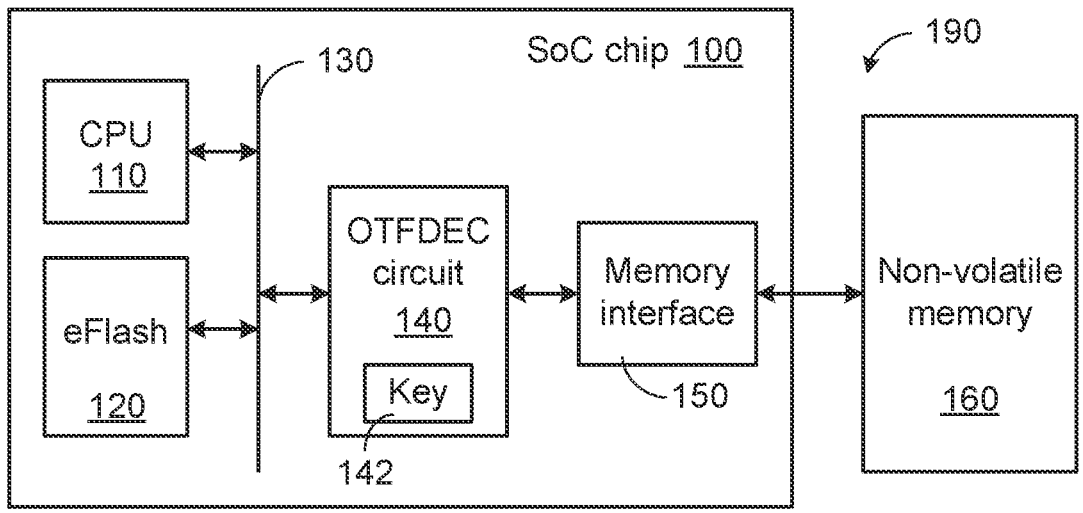
FIG. 1 (prior art) is a schematic circuit diagram illustrating an SoC architecture for a conventional embedded system.
Figure 2:
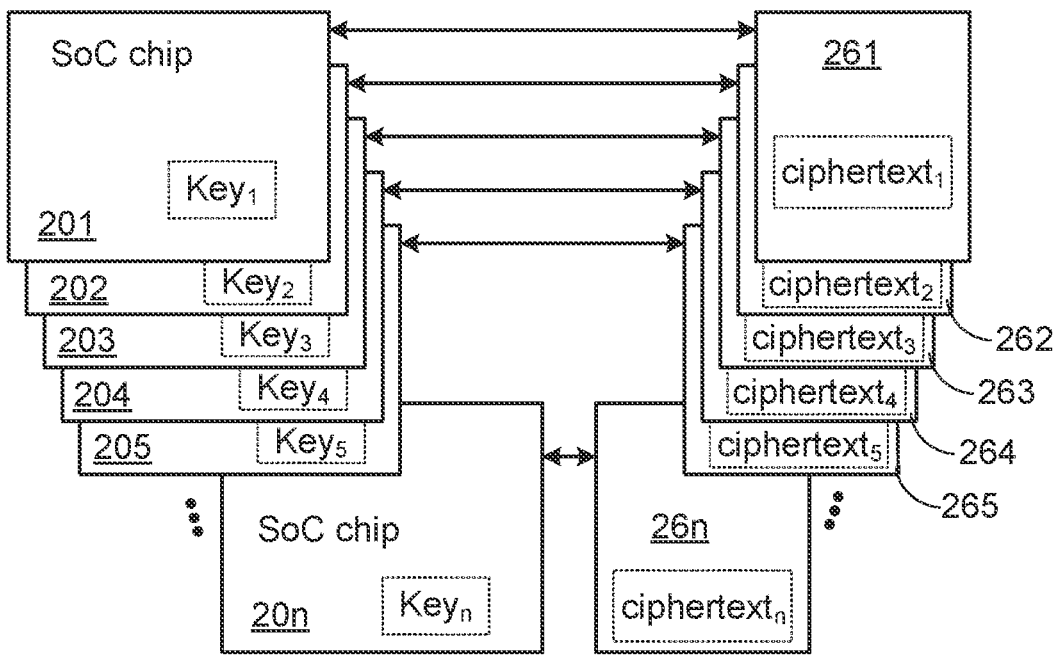
FIG. 2 (prior art) schematically illustrates n identical conventional embedded systems.
Figure 3:
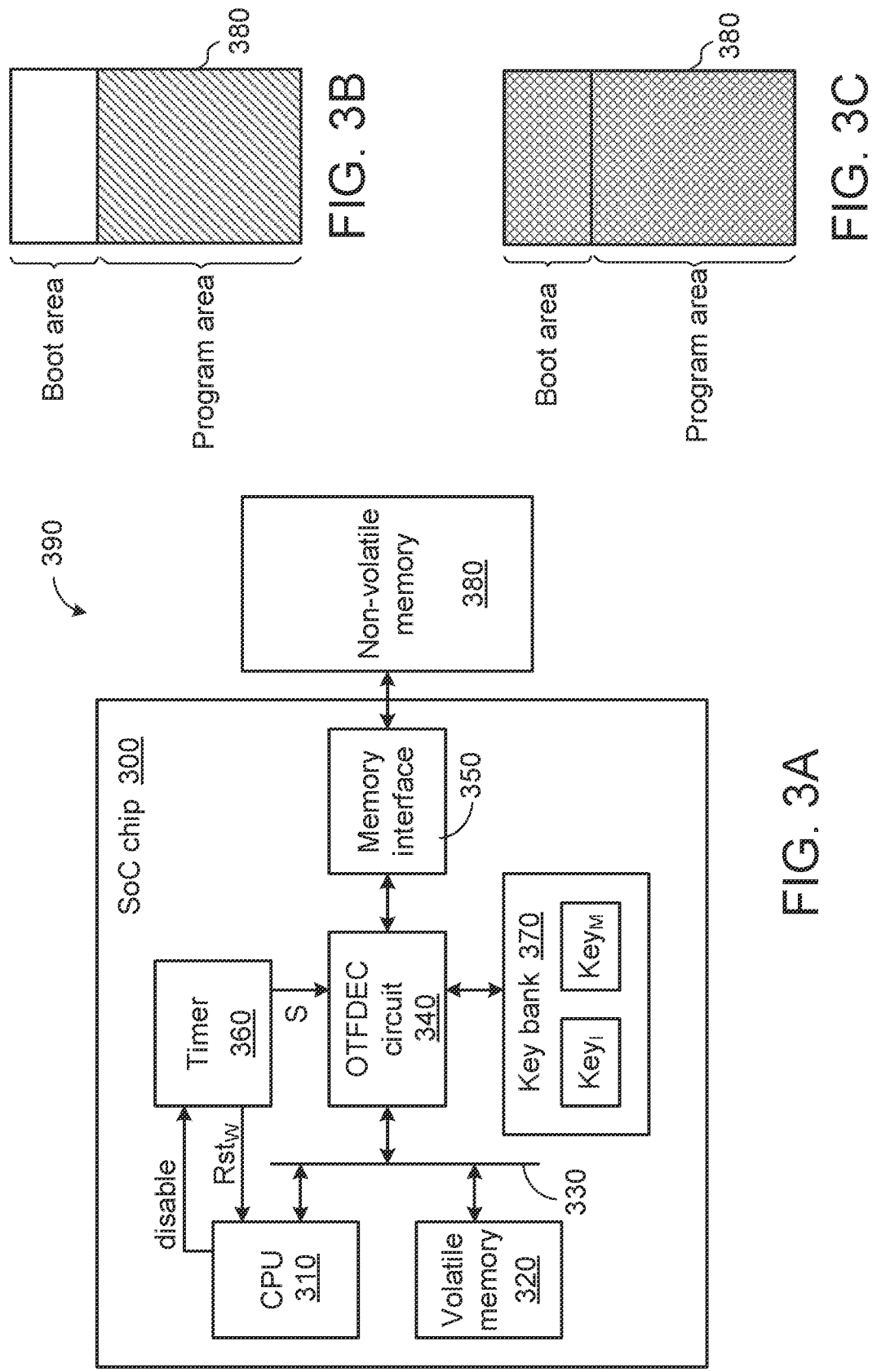
FIG. 3A is a schematic circuit diagram illustrating an SoC architecture according to an embodiment of the present invention.
FIGS. 3B and 3C schematically illustrate the storage formats of the non-volatile memory in the SoC architecture as shown in FIG. 3A.

FIG. 3A is a schematic circuit diagram illustrating an SoC architecture according to an embodiment of the present invention. The SoC architecture 390 comprises an SoC chip 300 and an external non-volatile memory 380. Moreover, the SoC chip 300 is connected with the external non-volatile memory 380.

The SoC chip 300 comprises a central processing unit 310, a volatile memory 320, a system bus 330, an on-the-fly decryption circuit (also referred as an OTFDEC circuit) 340, a memory interface 350, a timer 360 and a key bank 370. For example, the volatile memory 320 is a dynamic random access memory (DRAM) or a static random access memory (SRAM).

The central processing unit 310, the volatile memory 320 and the OTFDEC circuit 340 are connected with the system bus 330. The memory interface 350 is connected between the OTFDEC circuit 340 and the non-volatile memory 380. The OTFDEC circuit 340 is also connected with the key bank 370. The OTFDEC circuit 340 performs the encryption operation and the decryption operation according to plural keys in the key bank 370. The key bank 370 at least contains an initial key $Key_1$ and a main key $Key_M$. Generally, the initial keys $Key_1$ in the key banks 370 of plural identical SoC architectures 390 are identical. The initial keys $Key_1$ are inputted into the key banks 370 by the manufacturer. Moreover, the main keys $Key_M$ of different SoC architectures 390 are different. The main keys $Key_M$ are the unique main keys that can only be read by the corresponding OTFDEC circuit 340.

Moreover, the OTFDEC circuit 340 can be operated in plural operation modes. For example, the operation modes of the OTFDEC circuit 340 includes a normal mode, a bypass mode and a two-key mode. In the normal mode, the OTFDEC circuit 340 performs the encryption operation and the decryption operation according to the main key $Key_M$. In the bypass mode, the OTFDEC circuit 340 does not use any key to perform the encryption operation and the decryption operation. In the two-key mode, the OTFDEC circuit 340 performs the decryption operation according to the initial key $Key_1$, and the OTFDEC circuit 340 performs the encryption according to the main key $Key_M$.

When the SoC architecture is powered on or reset, the timer 360 starts to count time. When the timer 360 is disabled, the timer 360 stops counting time. After the timer 360 has counted time for a specified time period, a set signal S is generated. According to the set signal S, the operation mode of the OTFDEC 340 is changed. In addition, the timer 360 generates a warm reset signal RstW to the central processing unit 310.

FIGS. 3B and 3C schematically illustrate the storage formats of the non-volatile memory in the SoC architecture as shown in FIG. 3A. In an embodiment, the storage formats of the non-volatile memory 380 include an initial format and an operation format.

As shown in FIG. 3B, the initial format of the non-volatile memory 380 contains an initial boot code and an encrypted data. The initial boot code is stored in a boot area. The encrypted data is stored in a program area. The initial boot code is a plaintext. The encrypted data contains the content that is encrypted according to the initial key Key1. After the SoC architecture 390 is manufactured, the storage format of the non-volatile memory 380 is the initial format.

As shown in FIG. 3C, the operation format of the non-volatile memory 380 contains an encrypted boot code and an encrypted program code. The encrypted boot code is stored in the boot area. The encrypted program code is stored in the program area. Each of the encrypted boot code and the encrypted program code contains the content that is encrypted according to the main key $Key_M$.

After the SoC architecture 390 is powered on for a first time, the storage format in the non-volatile memory 380 is changed from the initial format to the operation format by the SoC chip 300. The detailed operating principles will be described as follows.

Figure 4:
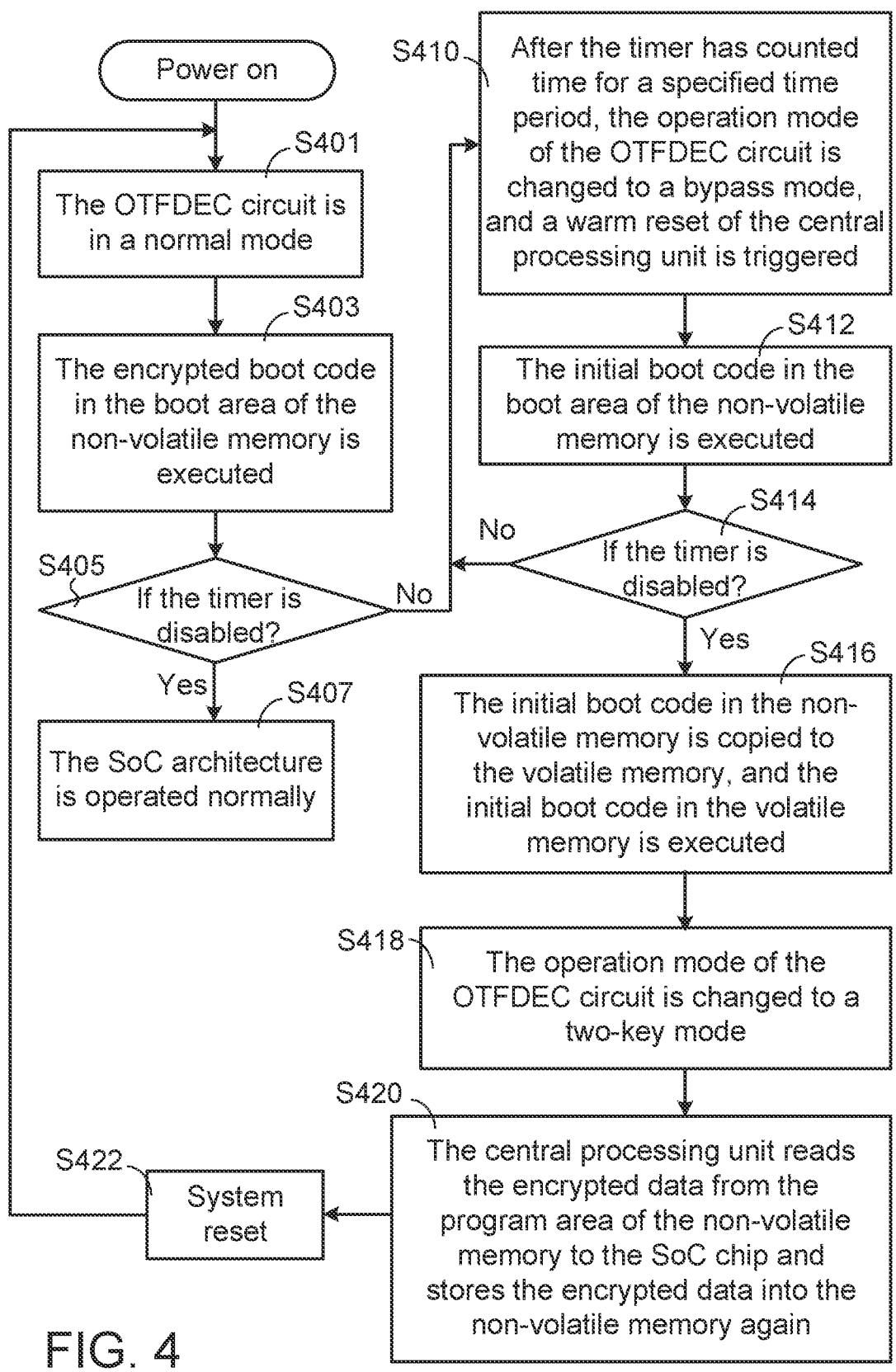
FIG. 4 is a flowchart illustrating a data protection method for the SoC architecture according to an embodiment of the present invention.

FIG. 4 is a flowchart illustrating a data protection method for the SoC architecture according to an embodiment of the present invention.

After the SoC architecture is powered on, the OTFDEC circuit 340 is in a normal mode (Step S401). Meanwhile, the OTFDEC circuit 340 reads the main key $Key_M$ from the key bank 370 and performs an encryption operation and a decryption operation according to the main key $Key_M$.

When the OTFDEC circuit 340 is in the normal mode, the central processing unit 310 executes the encrypted boot code in the boot area of the non-volatile memory 380 (Step S403). The encrypted boot code contains a disable command. In response to the disable command, the timer 360 is disabled.

If the timer 360 is disabled (Step S405), it means that the storage format in the non-volatile memory 380 is the operation format as shown in FIG. 3C. Meanwhile, the encrypted boot code in the non-volatile memory 380 is successfully decrypted into a plaintext by the OTFDEC circuit 340 according to the main key $Key_M$. The plaintext is executable by the central processing unit 310. While the plaintext (i.e., the decrypted boot code) is executed by the central processing unit 310, the timer 360 is disabled, and the initialization is completed.

Then, the SoC architecture 390 is operated normally (Step S407). Under this circumstance, the central processing unit 310 executes the encrypted program code in the program area of the non-volatile memory 380 through the decryption operation and the encryption operation of the OTFDEC circuit 340.

As mentioned above, in the steps S401, S403, S405 and S407, the SoC architecture 390 is operated normally. Under this circumstance, the storage format in the non-volatile memory 308 is the operation format. That is, in the normal mode, the OTFDEC circuit 340 performs the encryption operation and the decryption operation according to the main key $Key_M$.

Whereas, if the timer 360 is not disabled (Step S405), it means that the OTFDEC circuit 340 cannot successfully decrypt the content in the non-volatile memory 380 into the plaintext that is executable by the central processing unit 310. Consequently, the SoC chip 300 is crashed, and the timer 360 is unable to be disabled. Under this circumstance, the storage format in the non-volatile memory 380 is not the operation format, but the storage format in the non-volatile memory 380 is the initial format as shown in FIG. 3B. The initial format indicates that the SoC architecture 390 is powered on for the first time.

If the central processing unit 310 is unable to disable the timer 360, a step S410 is performed. That is, after the timer 360 has counted time for a specified time period, the operation mode of the OTFDEC circuit 340 is changed to a bypass mode, and a warm reset of the central processing unit 310 is triggered (Step S410). That is, after the specified time period, the timer 360 generates a set signal S. In response to the set signal S, the operation mode of the OTFDEC circuit 340 is changed to the bypass mode. In addition, the timer 360 generates a warm reset signal RstW to the central processing unit 310. Consequently, the SoC architecture 390 is subject to the warm reset.

After the warm reset is completed, the central processing unit 310 executes the initial boot code in the boot area of the non-volatile memory 380 (step S412). That is, when the OTFDEC circuit 340 is in the bypass mode, the OTFDEC circuit 340 performs the encryption operation and the decryption operation without the need of using any key. Consequently, in the condition that the OTFDEC circuit 340 does not perform the decryption operation, the central processing unit 310 executes the initial boot code in the non-volatile memory 380 directly.

Similarly, the initial boot code contains a disable command. In response to the disable command, the timer 360 is disabled. That is, after the warm reset of the SoC architecture 390 is completed, the timer 360 restarts counting time.

If the timer 360 is disabled (Step S414), it means that the central processing unit 310 successfully executes the initial boot code and disables the timer 360. Whereas, if the timer 360 is unable to be disabled (Step S414), it means that the central processing unit 310 is unable to successfully execute the initial boot code. Then, the step S410 is repeatedly done.

If the timer 360 is disabled (Step S414), the central processing unit 310 continuously executes the initial boot code of the non-volatile memory 380. Moreover, the initial boot code in the non-volatile memory 380 is copied to the volatile memory 320, and the initial boot code in the volatile memory 390 is executed (Step S416). After the initial boot code is copied from the non-volatile memory 380 to the volatile memory 320, the instruction pointer of the central processing unit 310 points to the address of the volatile memory 320. Consequently, the central processing unit 310 executes the initial boot code in the volatile memory 320.

Then, the operation mode of the OTFDEC circuit 340 is changed to a two-key mode by the central processing unit 310 according to the initial boot code in the volatile memory 320 (Step S418). That is, the OTFDEC circuit 340 performs the decryption operation according to the initial key $Key_1$, and the OTFDEC circuit 340 performs the encryption operation according to the main key $Key_M$.

Then, the central processing unit 310 reads the encrypted data from the program area of the non-volatile memory 380 to the SoC chip 300 according to the initial boot code in the volatile memory 320 and stores the encrypted data into the non-volatile memory 380 again (step S420). Under this circumstance, the OTFDEC circuit 340 is in the two-key mode. Consequently, when the encrypted data is read to the SoC chip 300, the encrypted data is decrypted into the plaintext by the OTFDEC circuit 340 according to the initial key $Key_I$.

Moreover, when the plaintext is stored into the non-volatile memory 380 by the central processing unit 310, the OTFDEC circuit 340 encrypts the plaintext into the encrypted boot code and the encrypted program code according to the main key $Key_M$. Moreover, the encrypted boot code and the encrypted program code are overwritten into the non-volatile memory 380. Consequently, the storage format in the non-volatile memory 380 is changed from the initial format as shown in FIG. 3B to the operation format as shown in FIG. 3C.

After the step S420 is completed, the central processing unit 310 executes a system reset command of the initial boot code in the volatile memory 320. Consequently, the SoC architecture 390 is subjected to a system reset (Step S422). Then, the step S401 is repeatedly done.

After the system reset of the system on a chip 390 is completed, the storage format of the non-volatile memory 380 is changed to the operation format. Consequently, the SoC architecture 390 performs the steps S401 to S407. That is, the flowchart will not go back to the steps S410 to S422.

As mentioned above, when the SoC architecture 390 is powered on for the first time, the timer 360 is not disabled. Consequently, after the timer 360 has counted time for a specified time period, the warm reset of the central processing unit 310 is performed. Then, under control of the central processing unit 310, the storage format in the non-volatile memory 380 is changed from the initial format to the operation format according to the initial key $Key_I$ and the main key $Key_M$ in the key bank 370 by the OTFDEC circuit 340.

Moreover, after the SoC architecture 390 is subjected to the system reset or powered on again, the OTFDEC circuit 340 performs the encryption operation and the decryption operation according to the main key $Key_M$. Consequently, the central processing unit 310 executes the encrypted boot code in the non-volatile memory successfully and completes the initialization. Then, the encrypted program code in the non-volatile memory 380 is executed. Consequently, the SoC architecture 390 can be operated normally.

When the SoC architecture 390 leaves the factory, the storage format in each non-volatile memory 380 has the same initial format. Consequently, during the manufacturing process of the SoC architecture 390, it is necessary to manage the collocation between the SoC chip 300 and the non-volatile memory 380. Consequently, the management cost is largely reduced.

As mentioned above, different SoC chips have the different main keys $Key_M$. Consequently, after each SoC chip 300 is powered on for the first time and the storage format in the corresponding non-volatile memory 380 is changed to the operation mode, different ciphertexts are stored in the non-volatile memories 380 of different SoC architectures.

In comparison with the conventional SoC architecture, the SoC architecture 390 of the present invention is not equipped with the embedded flash memory to store the boot code. In the SoC architecture 390 of the present invention, the boot code is stored in the boot area of the non-volatile memory 380. In other words, the SoC chip 300 without the embedded flash memory is suitably used in the SoC architecture 390 of the present invention.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An System on chip (SoC) architecture, comprising:
a non-volatile memory; and
an SoC chip connected with the non-volatile memory, wherein the SoC chip comprises a central processing unit, a volatile memory, a system bus, an on-the-fly cryptographic circuit, a memory interface, a timer and a key bank,
wherein the central processing unit, the volatile memory and the on-the-fly cryptographic circuit are connected with the system bus, the memory interface is connected between the on-the-fly cryptographic circuit and the non-volatile memory, and the on-the-fly cryptographic circuit is also connected with the key bank, wherein the on-the-fly cryptographic circuit performs an encryption operation or a decryption operation according to a plurality of keys in the key bank,
wherein after the SoC architecture is powered on, when the timer is not disabled and the timer has counted time for a specified time period, the central processing unit is subjected to a warm reset, and a storage format in the non-volatile memory is changed from an initial format to an operation format by the central processing unit;
wherein the data protection method comprising steps of:
(a) after the SoC architecture is powered on, allowing the on-the-fly cryptographic circuit to be operated in a normal mode;
(b) the central processing unit executing an encrypted boot code stored in the non-volatile memory, wherein the encrypted boot code contains a disable command for disabling the timer;

(c) when the timer is disabled, the central processing unit executing an encrypted program code in the non-volatile memory, so that the SoC architecture is operated in the normal mode;

(d) when the timer is not disabled and the timer has counted time for a specified time period, changing an operation mode of the on-the-fly cryptographic circuit to a bypass mode, and triggering a warm reset of the central processing unit;

(e) after the warm reset of the central processing unit is completed, the central processing unit executing an initial boot code in the non-volatile memory, wherein the initial boot code contains the disable command for disabling the timer;

(f) when the timer is not disabled, performing the step (d) again;

(g) when the timer is disabled, the central processing unit copying the initial boot code from the non-volatile memory to the volatile memory, and executing the initial boot code in the volatile memory;

(h) the central processing unit changing the operation mode of the on-the-fly cryptographic circuit to a two-key mode according to the initial boot code in the volatile memory;

(i) the central processing unit reading an encrypted data from non-volatile memory to the SoC chip according to the initial boot code in the volatile memory, and storing the encrypted data into the non-volatile memory again; and (j) performing a system reset.

2. The SoC architecture as claimed in claim 1, wherein the warm reset of the central processing unit is completed, the central processing unit controls the on-the-fly cryptographic circuit to perform the decryption operation according to an initial key and perform the encryption operation according to a main key, and the storage format in the non-volatile memory is changed from the initial format to the operation format by the central processing unit.

3. The SoC architecture as claimed in claim 2, wherein the initial format in the non-volatile memory contains an initial boot code and an encrypted data, and the operation format in the non-volatile memory contains an encrypted boot code and an encrypted program code, wherein when the central processing unit executes the initial boot code, the encrypted data is decrypted into a plaintext by the on-the-fly cryptographic circuit according to the initial key, wherein the plaintext is encrypted into the encrypted boot code and the encrypted program code according to the main key by the on-the-fly cryptographic circuit, and the encrypted boot code and the encrypted program code are overwritten into the non-volatile memory.

4. The SoC architecture as claimed in claim 3, wherein when the timer is disabled, the on-the-fly cryptographic circuit performs the encryption operation and the decryption operation according to the main key, and the central processing unit executes the encrypted boot code and the encrypted program code in the non-volatile memory.

5. The data protection method as claimed in claim 1, wherein when the on-the-fly cryptographic circuit is in the normal mode, the on-the-fly cryptographic circuit performs the encryption operation and the decryption operation according to a main key in the key bank.

6. The data protection method as claimed in claim 5, wherein when the on-the-fly cryptographic circuit is in the bypass mode, the on-the-fly cryptographic circuit does not perform the encryption operation and the decryption operation.

7. The data protection method as claimed in claim 6, wherein when the on-the-fly cryptographic circuit is in the two-key mode, the on-the-fly cryptographic circuit performs the encryption operation according to the main key in the key bank, and the on-the-fly cryptographic circuit performs the decryption operation according to an initial key in the key bank.

8. The data protection method as claimed in claim 7, wherein in the step (h), the central processing unit executes the initial boot code, the encrypted data is decrypted into a plaintext by the on-the-fly cryptographic circuit according to the initial key, the plaintext is encrypted into the encrypted boot code and the encrypted program code according to the main key by the on-the-fly cryptographic circuit, and the encrypted boot code and the encrypted program code are overwritten into the non-volatile memory.

* * * * *